June 30, 1953 R. BEAUFOY 2,644,037

ELECTRIC WAVE DISTORTING NETWORK

Filed Feb. 18, 1952 2 Sheets-Sheet 1

INVENTOR
Raymond Beaufoy
By Ralph B. Stewart
attorney

INVENTOR
Raymond Beaufoy
By Ralph B. Stewart

UNITED STATES PATENT OFFICE 2,644,037

ELECTRIC WAVE DISTORTING NETWORK

Raymond Beaufoy, Taplow, England, assignor to British Telecommunications Research Limited, Taplow, England, a company of Great Britain Application February 18, 1952, Serial No. 272,239
In Great Britain February 22, 1951

4 Claims. (Cl. 178—70)

The present invention relates to electric wave distorting networks, and is concerned with such networks for use in providing output voltage of substantially rectangular wave form.

A requirement sometimes arises for a network whereby a predetermined one or more of a succession of pulses can be shortened or lengthened. For example in test equipment for use in testing teleprinter apparatus it may be required to shorten or lengthen the duration of some of the elements of an otherwise undistorted teleprinter signal. For example it may be required to shorten all negative, or space, elements in the teleprinter signal, and to lengthen all positive, or mark, elements. On the other hand it may be required to vary the duration of only, say, the "start" and "stop" elements of the teleprinter signal.

An object of the present invention is to provide improved apparatus whereby the aforesaid requirements can be met.

According to the present invention, an electric wave distorting network comprises a capacitor connected in series with a resistor to the input terminals of the network, a switching device responsive to the voltage across the capacitor exceeding a predetermined amount in one sense to become switched on, and responsive to the said voltage exceeding a predetermined amount in the other sense to become switched off, and a further switching device adapted to apply and remove a short-circuit across a part of the said resistor automatically to alter the time constant of charge of the capacitor in respect to a predetermined one or more of a succession of voltage pulses applied to the input terminals of the network. The voltage pulses in the succession may, for example, be successive half-cycles of an alternating voltage of rectangular wave form, or successive elements of a telegraph signal.

According to a feature of the invention, the further switch device comprises two rectifiers connected in series opposition across the resistor, and the junction of the two rectifiers is connected to a tap on the resistor. The tap may be made variable whereby the amount of distortion introduced can be varied. The arrangement according to this feature of the invention functions to distort all positive-going pulses in one sense, and all negative-going pulses in the other sense.

According to a further feature of the invention the further switch device is adapted to apply or remove the said short-circuit only in respect to voltage pulses of predetermined characteristics. For example where the succession of voltage pulses is provided by a teleprinter signal the pulse of the said predetermined characteristics may be the stop element of the signal. Distortion of only the stop and start elements of a succession of teleprinter signals may then be achieved.

Figure 1:
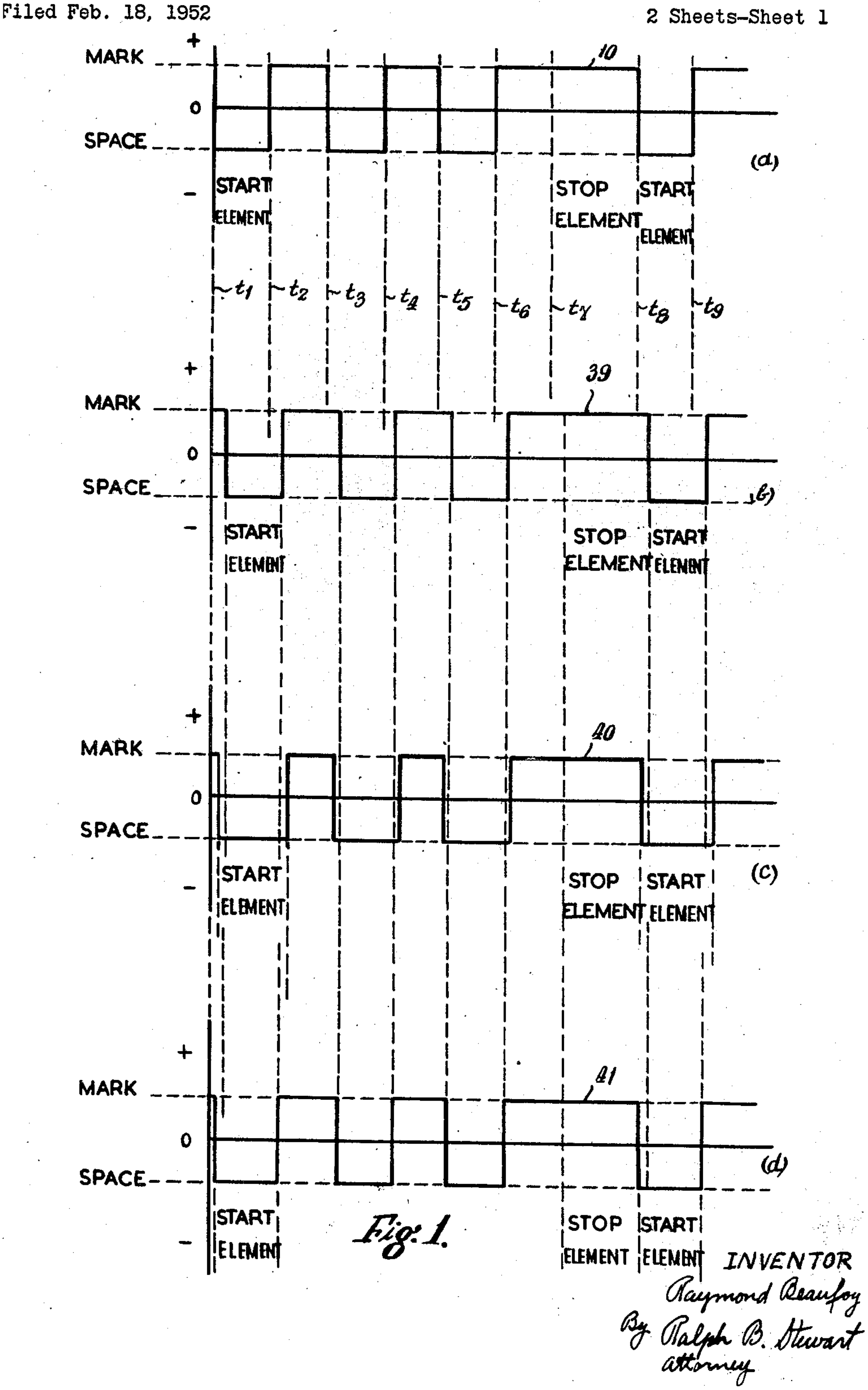
Figure 2:
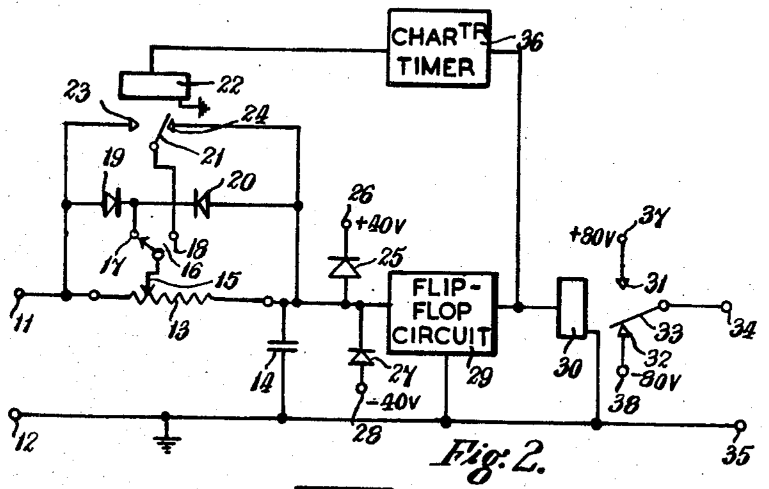
Figure 3:
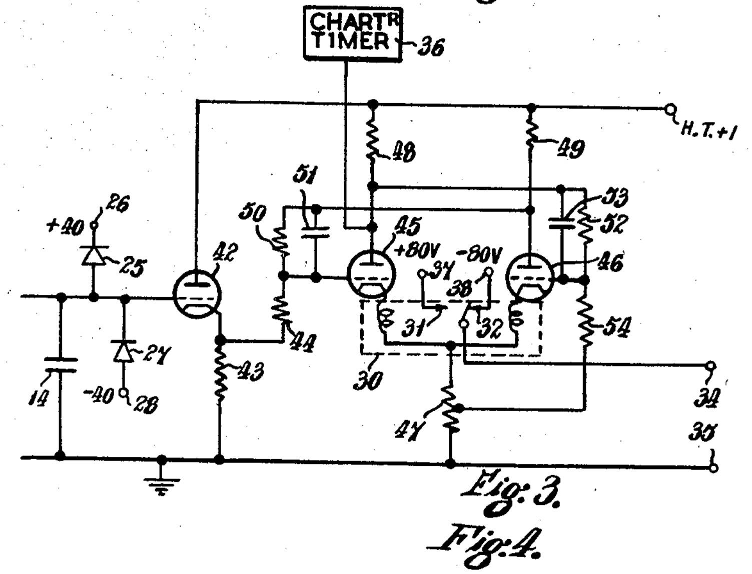
Figure 4:
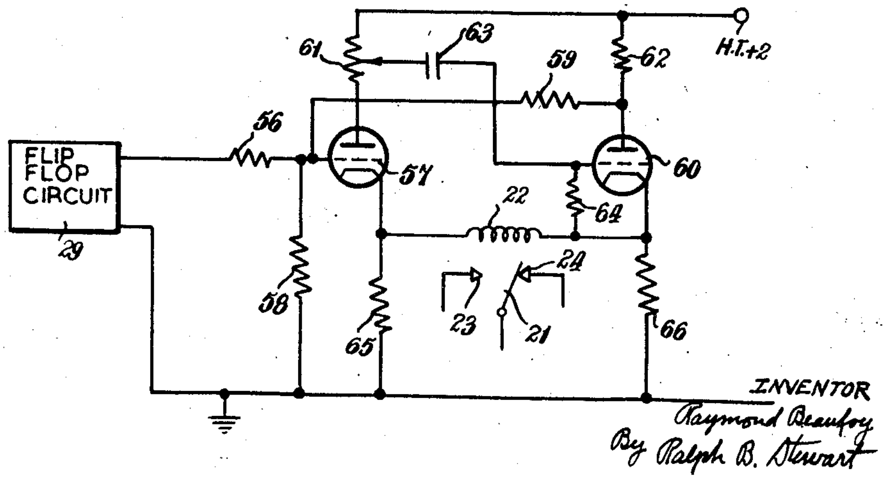

The invention will now be described by way of example with reference to the accompanying drawings, in which Figure 1 is an explanatory diagram, Figure 2 is a theoretical circuit diagram of one embodiment of the invention for use in producing, from undistorted teleprinter signals, teleprinter signals of known distortion, and Figures 3 and 4 are theoretical circuit diagrams of two parts respectively shown in block form in Figure 2.

Throughout Figure 1 the abscissae represent time and the ordinates represent voltage.

In Figure 1 (*a*) the full line 10 represents an undistorted teleprinter signal comprising a series of signal elements representative of a character. The series comprises a start element extending from $t_1$ to $t_2$ followed by five alternate mark and space elements which in turn are followed by a stop element extending from $t_7$ to $t_8$. The durations of the start element and the succeeding five mark and space elements are equal and the duration of the stop element is 1½ times that of the start element and any of the mark and space elements.

The embodiment of the invention now to be described is such that the relative durations of the mark and space elements can be varied and that the duration of the stop and start elements can be varied independently of the other elements of the series.

Referring to Figure 2, two input terminals 11 and 12 are provided and a resistor 13 and capacitor 14 are connected in series to the two input terminals 11 and 12. The terminal 12 is earthed. The resistor 13 is constituted by the fixed element of a potentiometer whose wiper 15 is connected to the moving contact of a switch 16. This switch has two fixed contacts 17 and 18 of which 17 is connected to the junction of two rectifiers 19 and 20 which are connected in series opposition across the resistor 13.

The other fixed contact 18 of the switch 16 is connected to the moving contact of a set of relay contacts 21 of a relay 22. The set of contacts 21 includes two fixed contacts 23 and 24 which are connected to opposite ends respectively of the resistor 13.

The upper plate in the drawing of the capacitor 14 is connected to the anode of a rectifier 25 whose cathode is connected to a terminal 26 held at a potential of +40 volts. The upper plate of the capacitor 14 is also connected to the cathode of a rectifier 27 whose anode is connected to a terminal 28 held at a potential of −40 volts. The junction of the anode of the rectifier 25 with the cathode of the rectifier 27 is connected to the input of a flip-flop circuit 29. A flip-flop circuit is one which takes up a first stable condition when a positive voltage is applied thereto and takes up a second suitable condition when a negative voltage is applied thereto.

The amplitude of the voltage necessary to cause the flip-flop circuit to change from one of its conditions to the other may be of any convenient value, but in the example now being described it will be assumed that the amplitude necessary is +20 volts and −20 volts. A suitable flip-flop circuit will be described later with reference to Figure 3.

The output of the flip-flop circuit is fed to a telegraph relay 30 which has two fixed contacts 31 and 32 and a moving contact 33, the moving contact being connected to an output terminal 34. A second output terminal 35 is provided this terminal being connected to earth. Fixed contacts 31 and 32 are connected to terminals 37 and 38 which are held at +80 volts and −80 volts respectively.

A character timer 36 (to be described later) is connected between the flip-flop circuit 29 and the relay 22.

If undistorted teleprinter signals as shown in Fig. 1(*a*) are applied to the terminals 11 and 12 when the switch 16 is in the position shown, all positive-going elements of the signal cause the rectifier 19 to become conducting and hence charging current flows from the terminal 11 through the rectifier 19 and the part of the resistor 13 which lies between the wiper 15 and the capacitor 14, into the capacitor 14. All negative-going elements of the signal cause the rectifier 20 to become conducting and hence the charging current for the capacitor 14 during such elements flows through the part of the resistor 13 which lies between the wiper 15 and the terminal 11, and through the rectifier 20.

Thus the time taken for the capacitor 14 to become charged to the voltage at which the flip-flop circuit 29 is triggered (that is to say +20 volts and −20 volts in this example) can be made different for negative- and positive-going elements of the signal by appropriate adjustment of the wiper 15 on the resistance element 13. The effect of setting the wiper 15 at the centre of the resistance element 13 would be to provide equal time constants of charge for the capacitor 14 in respect of both negative- and positive-going elements of the signal.

It is arranged, as will be described later, that whenever the flip-flop circuit 29 is triggered by negative- and positive-going signal elements the energisation of the relay 30 is reversed and hence the polarity of the output terminal 34 changes from −80 to +80 volts or vice-versa as the case may be.

Referring now to Figure 1(*b*), the full line 39 represents the voltage appearing at the output terminal 34 when the wiper 15 of Figure 2 is set to the central position on the resistance element 13. The time constant of charge of the capacitor 14 is the same for negative- and positive-going signal elements and hence no distortion appears in the output signal at terminal 34. The output is merely delayed in time relatively to the signal applied to the input terminals 11 and 12.

In Figure 1(*c*) the full line 40 illustrates the effect of adjusting the wiper 15 to a position on the resistance element 13 at which the time constant of charge of the capacitor 14 is shorter in respect to negative-going signal elements than it is to positive-going signal elements, that is to say to a position as shown in Figure 2. The full line 40 indicates the waveform of the voltage appearing at the output terminal 34 of Figure 1 and it will be seen that the negative-going elements (including the start element) are all lengthened, whereas the positive-going elements (including the stop element) are all shortened.

The amplitude of the undistorted teleprinter signal in this example may conveniently be ±80 volts. The two rectifiers 25 and 27 biased as described constitute a limiter which prevents the voltage across the capacitor 14 from exceeding ±40 volts and the voltage across the capacitor 14 is either +40 volts or −40 volts whenever a reversal takes place in the teleprinter signal applied to the input terminals 11 and 12. Thus the operation of the network is not dependent upon the capacitor 14 becoming fully charged during each mark and space element and hence a long time constant can be employed. The time taken for the voltage across the capacitor 14 to reach −20 volts from +40 volts and to reach +20 volts from −40 volts during operation is a function of the amplitude of the signals applied to the input terminals and the time constant of the capacitor and resistor connected in series therewith. Thus for a given amplitude of applied signal the amount of distortion introduced can be expressed in terms of the time constant and hence a scale associated with the wiper 15 can be calibrated in percentage distortion.

The distortion produced in the arrangement as so far described is usually termed bias distortion.

The network of Figure 2 also enables distortion of only the start and stop elements of the signal to be effected, the remaining elements being allowed to remain undistorted. This facility is obtained by moving the arm of the switch 16 to the fixed contact 18 thereby rendering the rectifiers 19 and 20 inoperative and rendering the relay 22 operative.

The character timer 36 is made such that the relay 22 is energised for the duration of each stop element in the applied teleprinter signal and for the remainder of each signal is de-energised. Thus the time taken for the capacitor 14 to be charged to −20 volts from +40 volts (which is the voltage across the capacitor during the stop element) can be varied by varying the position on the wiper 15 and the resistance element 13. Thus, for example, with the wiper 15 in the position shown and the relay energised as shown, the part of the resistance element 13 which lies between the wiper 15 and the capacitor 14 is short-circuited by the relay contacts 21 and hence the time constant of charge of the capacitor 14 is relatively small. Throughout the remainder of the signal the part of the resistance element 13 between the wiper 15 and the terminal 11 is short-circuited and the time constant is relatively large. The time taken therefore for the capacitor 14 to be charged to −20 volts from +40 at the end of a stop element is less than at the end of any other positive-going elements in the signal. The waveform of the voltage appearing at the output terminal 34 is therefore as shown by the full line 41 in Figure 1(*d*) from which it will be seen that the stop element is shortened and the start element is lengthened but all other elements are of the same length as in Figure 1(*a*).

Referring now to Figure 3, this is a circuit diagram including a suitable flip-flop circuit for use at 29 in Figure 2. In Figure 3 the upper plate of the capacitor 14 is connected to the control grid of a triode valve connected as a cathode follower and having a cathode load resistor 43. This cathode follower serves to prevent the flip-flop circuit from affecting the time constant of charge of the capacitor 14. The cathode of the valve 42 is connected through a resistor 44 to the control grid of a further triode valve 45 whose cathode lead includes one winding of the relay 30. The second winding of the relay 30 is in the cathode lead of a further triode valve 46 and a cathode load resistor 47 is common to both triodes 45 and 46. The two triodes 45 and 46 are provided with anode load resistors 48 and 49 respectively and anode voltage for the three triodes is provided from a terminal HT+1. The control grid of the valve 45 is connected to the anode of the valve 46 through a resistor 50 which is shunted by a capacitor 51 and the control grid of the valve 46 is connected ot the anode of the valve 45 through a resistor 52 shunted by a capacitor 53. The control grid of the valve 46 is also connected through a resistor 54 to a tap on the common cathode resistor 47.

In operation the mean potential of the control grid of the cathode follower valve 42 is zero and goes alternately positive and negative. The cathodes of the valves 45 and 46 are positive relatively to earth because of the voltage drop across the common cathode resistor 47. When the control grid of the valve 42 is made positive the cathode thereof becomes more positive by a like amount and when the control grid of the valve 42 becomes negative by more than a predetermined amount the anode current in the valve 42 is reduced to zero. Thus the voltage between the control grid and cathode and the valve 45 can readily be made to change from a positive to a negative value.

The circuit is arranged in known manner such that when the control grid of the valve 42 reaches +20 volts the valve 45 becomes rapidly conducting and the valve 46 becomes non-conducting, and that when the voltage at the control grid of the valve 42 falls to −20 volts the valve 45 rapidly becomes non-conducting and the valve 46 becomes conducting.

Thus current flows firstly through one of the windings of the relay 30 and then through the other, whereby the waveforms as shown in Figure 1 are produced at the output terminal 34.

Referring now to Figure 4, this is a circuit diagram including a suitable character timer for use at 36 in Figure 2. The flip-flop circuit 29 is connected through a resistor 56 to the control grid of a triode valve 57 provided with a grid leak 58. The control grid of the triode 57 is connected through a resistor 59 to the anode of a further triode valve 60 and anode voltage for the two valves 57 and 60 is supplied from a terminal HT+2 through resistors 61 and 62 respectively. A connection is made from a tap on the resistor 61 through a capacitor 63 to the control grid of the valve 60 which is provided with a grid leak 64. Two resistors 65 and 66 are connected in the cathode leads of the two valves 57 and 60 respectively and the relay winding 22, corresponding to that shown in Figure 2, is connected between the cathodes of the two valves 57 and 60.

It will be seen that the character timer of Figure 4 is in the form of a well known multivibrator circuit. This circuit is such that the valve 57 is normally non-conducting and the valve 60 is normally conducting. On the application of a positive pulse to the control grid of the valve 57 the anode current in this valve rises rapidly. This causes a rapid fall in the anode voltage of the valve 57 and hence the control grid of the valve 60 is driven negatively and hence the anode potential of the valve 60 increases. This increase is transmitted to the control grid of the valve 57 causing a further rise in the anode current of this valve. This action is cumulative and a condition is rapidly reached in which the valve 60 is non-conducting and the valve 57 is highly conducting. The capacitor 63 then begins to discharge at a rate determined mainly by the values of the capacitor 63 and the resistor 64 and by the setting of the tap on the resistor 61. After an interval of time which may be varied by varying the position of the tap on the resistor 61 the valve 60 becomes conducting once more. The process is then reversed and the valve 57 rapidly becomes non-conducting. A further positive pulse is then required at the control grid of the valve 57 to repeat the cycle of operations.

In the present example it is arranged that the time taken for the valve 57 to become conducting once more following the application of a positive pulse to the control grid of the valve 57, is equal to six mark and space elements, that is to say is equal to the duration of a complete character less the duration of the stop element.

The polarities of the signals applied to the control grid of the valve 57 are reversed relatively to those of the signals applied to the input terminals 11 and 12 of Figure 2 and hence each stop element applied to the terminal 57 is negative-going and each start element is positive-going. Thus, assuming that the cycle of operations of the circuit of Figure 4 commences at the beginning of a start element the valve 57 becomes conducting once more just at the commencement of the next succeeding stop element. The valve 57 remains conducting for the duration of this stop element and the next cycle of operations of the circuit of Figure 4 begins at the end of this stop element. This is the mode of operation taken up by the circuit of Figure 4, no special steps being necessary to ensure this synchronisation. This follows from the fact that the only elements which are identical in all teleprinter signals are the start and stop elements and hence if the circuit of Figure 4 is not in synchronism immediately after switching on a succession of varying teleprinter signals causes the circuit to pull into the synchronism very quickly.

Although the invention has been described with reference to a succession of teleprinter signals following immediately after one another, it will be understood that the embodiment described may also be used without modification for use in producing distortion of isolated teleprinter signals.

I claim:

1. An electric wave distorting network comprising a capacitor connected in series with a resistor to the input terminals of the network, a switching device responsive to the voltage across the capacitor exceeding a predetermined amount in one sense to become switched on and responsive to the said voltage exceeding a predetermined amount in the other sense to become switched off, and a further switching device adapted to apply and remove a short-circuit across a part of the said resistor automatically to alter the time constant of charge of the capacitor in respect to a predetermined one or more of a succession of voltage pulses applied to the input terminals of the network.

2. A network according to claim 1 for distorting all negative-going pulses in one sense and all positive-going pulses in the opposite sense, wherein the said further switch device comprises two rectifiers connected in series opposition across the resistor, and the junction of the two rectifiers is connected to a tap on the resistor.

3. A network according to claim 1 suitable for use in distorting selected ones of the said pulses, wherein the said further switch device is adapted to apply or remove the said short-circuit in response to voltage pulses of predetermined characteristics.

4. A network according to claim 3 for use in distorting the start and stop elements of teleprinter signals, wherein the said further switch device comprises a relay having a moving contact connected to a tap on the resistor and having two fixed contacts connected to the two ends of the resistor respectively, and the operating winding of the relay is energised from a timing device adapted to cause operation of the relay in one sense during each stop element and to cause operation of the relay in the other sense throughout the remainder of each teleprinter signal of a succession of teleprinter signals applied to the input terminals of the network.

RAYMOND BEAUFOY.

References Cited in the file of this patent

UNITED STATES PATENTS

| Number | Name | Date |
|---|---|---|
| 2,030,814 | Erickson et al. | Feb. 11, 1936 |
| 2,568,019 | Martin | Sept. 18, 1951 |